March 7, 1967  T. B. ROBINSON  3,307,764
APPARATUS FOR SHEARING, WELDING AND PLANISHING METAL STRIPS
Filed Dec. 19, 1963  7 Sheets-Sheet 1

Fig.1.

INVENTOR.
TRAVILLIS B. ROBINSON
BY
William J. Ruano
his ATTORNEY

March 7, 1967 T. B. ROBINSON 3,307,764
APPARATUS FOR SHEARING, WELDING AND PLANISHING METAL STRIPS
Filed Dec. 19, 1963 7 Sheets-Sheet 3

Fig.5.

INVENTOR.
TRAVILLIS B. ROBINSON
BY
William J. Ruano
his ATTORNEY

March 7, 1967 T. B. ROBINSON 3,307,764
APPARATUS FOR SHEARING, WELDING AND PLANISHING METAL STRIPS
Filed Dec. 19, 1963 7 Sheets-Sheet 5

INVENTOR.
TRAVILLIS B. ROBINSON
BY
his ATTORNEY

March 7, 1967

T. B. ROBINSON

3,307,764

APPARATUS FOR SHEARING, WELDING AND PLANISHING METAL STRIPS

Filed Dec. 19, 1963

INVENTOR.
TRAVILLIS B. ROBINSON
BY
*William J. Ruano*
his ATTORNEY

United States Patent Office 3,307,764
Patented Mar. 7, 1967

3,307,764
APPARATUS FOR SHEARING, WELDING AND PLANISHING METAL STRIPS
Travillis B. Robinson, Pittsburgh, Pa., assignor to Voss Engineering Company, Pittsburgh, Pa.
Filed Dec. 19, 1963, Ser. No. 331,709
17 Claims. (Cl. 228—5)

This invention relates to a method and apparatus for joining metal strips or sheets in end-to-end relationship and, more particularly, relates to an improved method and apparatus for shearing, welding and planishing said strips when held in abutting relationship, all of which operations are uniquely performed at a single station.

In the past, strips have been welded in end-to-end relationship at the same station at which shearing took place. An outstanding disadvantage of the equipment used (usually shear blades and a welder in a side-by-side unitary assembly), has been that such assembly is cumbersome and large in size requiring a large supporting framework and complicated parts, all of which have added to the expense of the machine.

A further disadvantage of conventional machines for shearing and welding at the same station has been that an annealed condition develops in the weld as a consequence of the heat of the welding process, forming a weak joint, particularly in consideration of pulling of the welded strip through a processing line which, in some cases, has resulted in tearing apart of the weld.

An object of the present invention is to provide a novel method and apparatus for overcoming the abovenamed disadvantages of conventional methods and apparatus so as to eliminate abnormal stresses and weakness in the welded joints of metal strips and sheets.

A more specific object of this invention is not only to shear and weld the strips (or sheets) at the same station, but to planish the weld in addition, so as to effect metal working and a stronger welded joint that can withstand relatively large pulling forces which are applied to the welded strip as it passes through the processing line and eventually into coils or pieces.

A still more specific object of my invention is to provide a novel unitary apparatus whereby the shearing assembly and the planishing assembly, mounted thereon, may be sequentially moved into place in operative position by means of a skate or carriage so as to eliminate the necessity of a large assembly combining these units.

Other objects and advantages of the invention will become more apparent from a study of the following description taken with the accompanying drawings wherein.

GENERAL ASSEMBLY AND STATEMENT OF OPERATION

Figure 1:
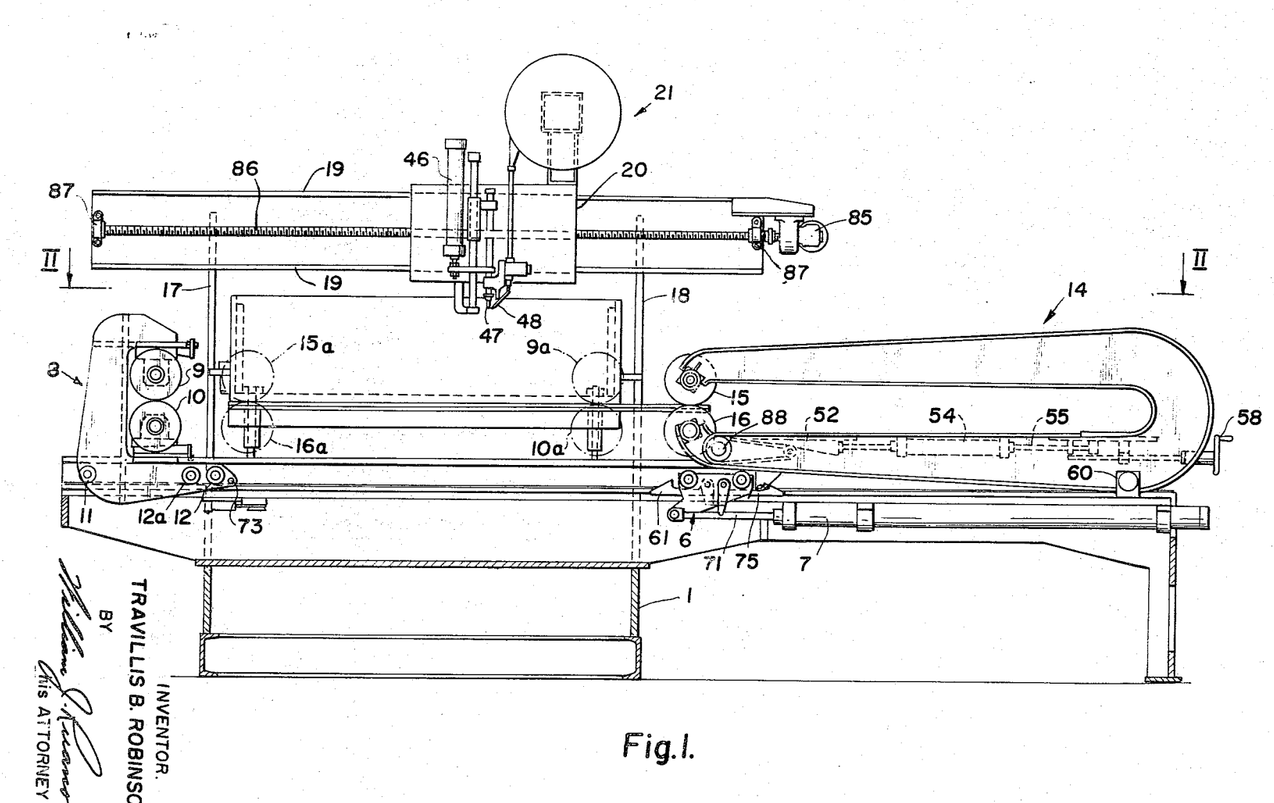
FIG. 1 is a side elevational view, partly in cross-section, of a complete assembly embodying the present invention, including a shearing unit, a welding unit and a planishing unit, together with a skate or carriage for selectively reciprocating the shearing and planishing units.

FIG. 1 shows the general assembly embodying the present invention, comprising a common base or framework 1 on which is supported a slidable shear head assembly 8 including adjustably mounted shearing blades 9 and 10. Very briefly stated, the shear head assembly is moved into the shearing position by a skate or carriage 6 which hooks onto the shear head and tows it by means of a fluid-powered cylinder 7. The shear head assembly continues to move so as to cut the trailing end of the leading strip and the leading end of the trailing strip in one operation while said ends are in overlapped, abutting or separated position and while clamped by means of clamping plates 39 and 39a, which are best shown in FIG. 5.

Figure 5:
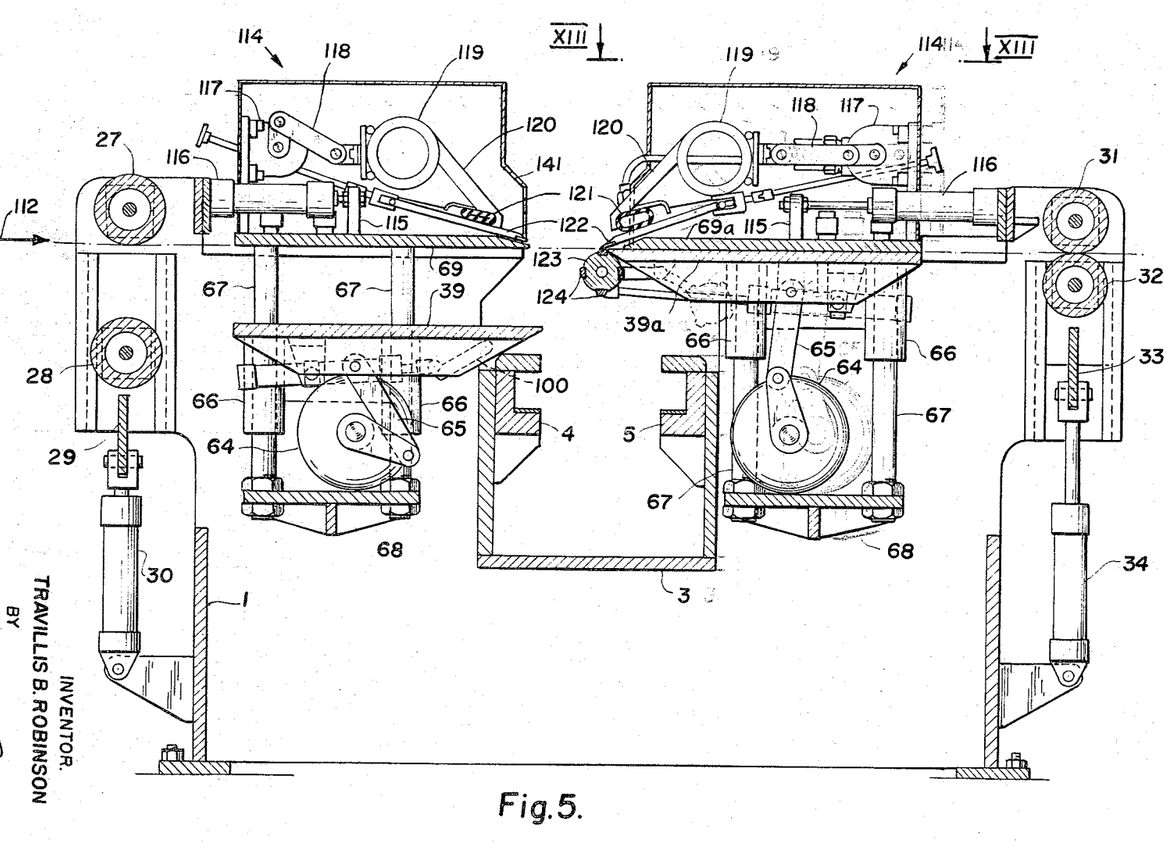
FIG. 5 is a somewhat enlarged, cross-sectional view showing the clamping means for holding the trailing end of the leading strip and the leading end of the trailing strip in end-to-end, abutting relationship before welding or planishing.

After shearing, the shear head assembly is returned by the skate 6 to the position shown in FIG. 1 and thereafter the weld head assembly 21 is lowered by fluid cylinder 46 into the welding position and driven transversely along tracks 19 to effect welding of the strips which have been butted and clamped by the manipulation of the table clamp assemblies, 114 of FIG. 5.

Following this, the weld head assembly is moved out of operative position, and thereafter a planisher assembly 14 hooks onto skate 6 and is moved thereby into the planishing position to effect planishing by moving one or more times between the adjustable positions 15a and 9a shown in dot and dash outline.

Thereafter, the clamping plates are released to allow the welded strip to move longitudinally until the trailing end of the welded strip enters the machine followed by a leading end of a new trailing strip, at which time the operation is repeated to sequentially shear, weld and planish the butted joints when the ends of the strips are held in end-to-end, abutting or adjusting confronting relationship. The above description is, of course, very general and merely to provide a better understanding of the purposes of the various component parts, the detailed construction and operation of which will be described more fully hereinafter.

SHEAR HEAD ASSEMBLY

Figures 9, 10:
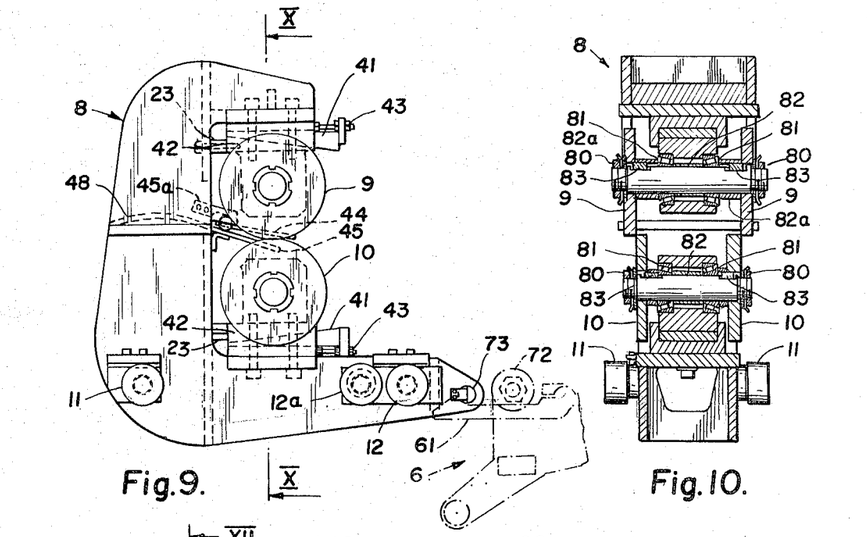
FIG. 9 and FIG. 10 are side and cross-sectional views, respectively, of the shearing unit shown in FIG. 1.

The shear head assembly 8 shown in FIG. 1, is more clearly illustrated in FIGS. 9 and 10 and comprises rotary shear blades 9 and 10 disposed in offset vertical planes, as shown in FIG. 10, in order to effect shearing. Highly improved adjustable means are shown in the form of relatively slidable wedges 41, 42, operated and held by adjusting bolts 43 to vertically adjust the shead blades. Such slidable wedges withstand heavy loads and maintain the adjusted position of the shear blades. Shims may be placed at 23 for the purpose of laterally adjusting the vertical axes of shear blades 9 and 10 so that both shear blades may have either a common vertical axis, or so that either of the pairs of shear blades may be moved to the right or to the left of the vertical axis of the other pair of shear blades so as to enable adjustment of the shear blades to suit different metals and thicknesses to prevent or minimize distortion during shearing, welding and/or planishing.

By virtue of the above described adjusting means and the fact that shear blades 10 are located between shear blades 9 in the manner shown, it is possible to form upstanding edges in the strip end portions when sheared, which may be subsequently welded together. The sheared strip end passes between guides 44 and 48 and through one-way ball check 45a and discharges to the left as shown in FIG. 9.

The shear head assembly 8 is propelled along horizontal trackways 4 and 5 by means of rollers 11 and 12, after latch bar 73 thereof is hooked to latch 61 of skate 6, shown in dot and dash lines in FIG. 9, which skate tows the shear head assembly into, along and then later, out of shearing position. The axis of rollers 12a is vertically offset with respect to that of rollers 11 and 12 so as to roll on the top of track 4, and rollers 12a may be adjusted by an eccentric to prevent tilting of the shear head assembly 8.

As will become more apparent in FIG. 10, the shear head assembly is so constructed as to prevent over-tightening or over-stressing of the bearings 81, since the parts are assembled together in the manner shown so as to provide limit stops to avoid undue lateral compression of the bearings 81. Tightening of nuts 80 will cause the shear blades to compress only spacers 82, bearing cones 81 and spacers 82a, thus exerting only the designed preload on bearings 81. Keys 83 are provided in the shafts of the shear blades to ensure simultaneous rotation of each pair of blades

WELD HEAD ASSEMBLY

The weld head assembly 21, best shown in FIG. 1, is of any conventional construction and may comprise an arc welding head 47 embodying an electrode and passage means to supply inert gas, such as argon, to the weld and, if desired, a consumable filler wire feed 48 and automatic means to control the length of arc depending on the thickness of the strips being joined. For welding light gauge, non-ferrous metals, such as aluminum, oxygen is introduced into the inert gas shield to enable such welding. Of course, any other suitable and well known welding means may be substituted, if so desired.

Figures 2, 3, 4:
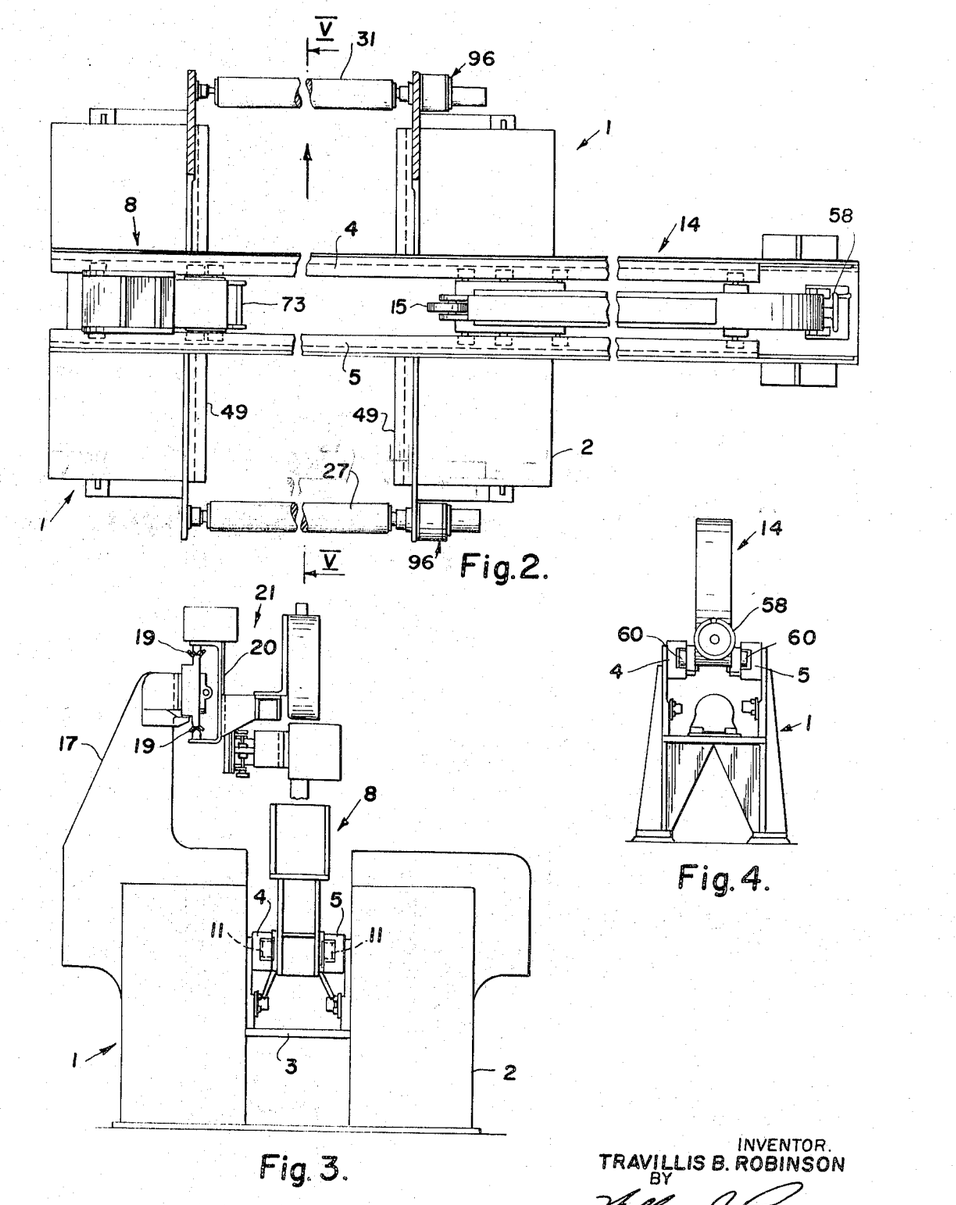
FIG. 2 is a top view of the structure shown in FIG. 1 with the weld head removed, for purposes of clarity.
FIG. 3 is a front view of the machine shown in FIG. 1
FIG. 4 is a rear view thereof.

The weld head 21 is mounted on a carriage 20 which is slidable along tracks 19 (see also FIG. 3) by rotation of a threaded shaft 86 supported by bearings 87 and rotated by an adjustable speed drive motor 85 to enable the welding unit to be moved transversely of the strips along the butted ends of the strips to be welded. Of course, before the welder can be operated it must be lowered into welding position in the machine, which lowering (as well as retracting) is effected by a hydraulic or fluid-operated cylinder 46.

PLANISHER ASSEMBLY

The planisher assembly 14 (see FIG. 6) comprises an essentially U-shaped frame having, at one extremity, stationarily mounted roll 15, and having at the other extremity, an adjustably mounted roll 16 which is pivotally movable about axis 88 by a bell crank lever 51 as a consequence of movement of a wedge 52 against roller 53 under the action of a hydraulic (or air) cylinder 54. That is, as piston rod 55 is forced to the left, as viewed in FIG. 6, so as to cause wedge 52 to push downwardly on roller 53, the planisher roll 16 is moved clockwise about axis 88 and therefore closer to roll 15.

Figures 6, 7, 8:
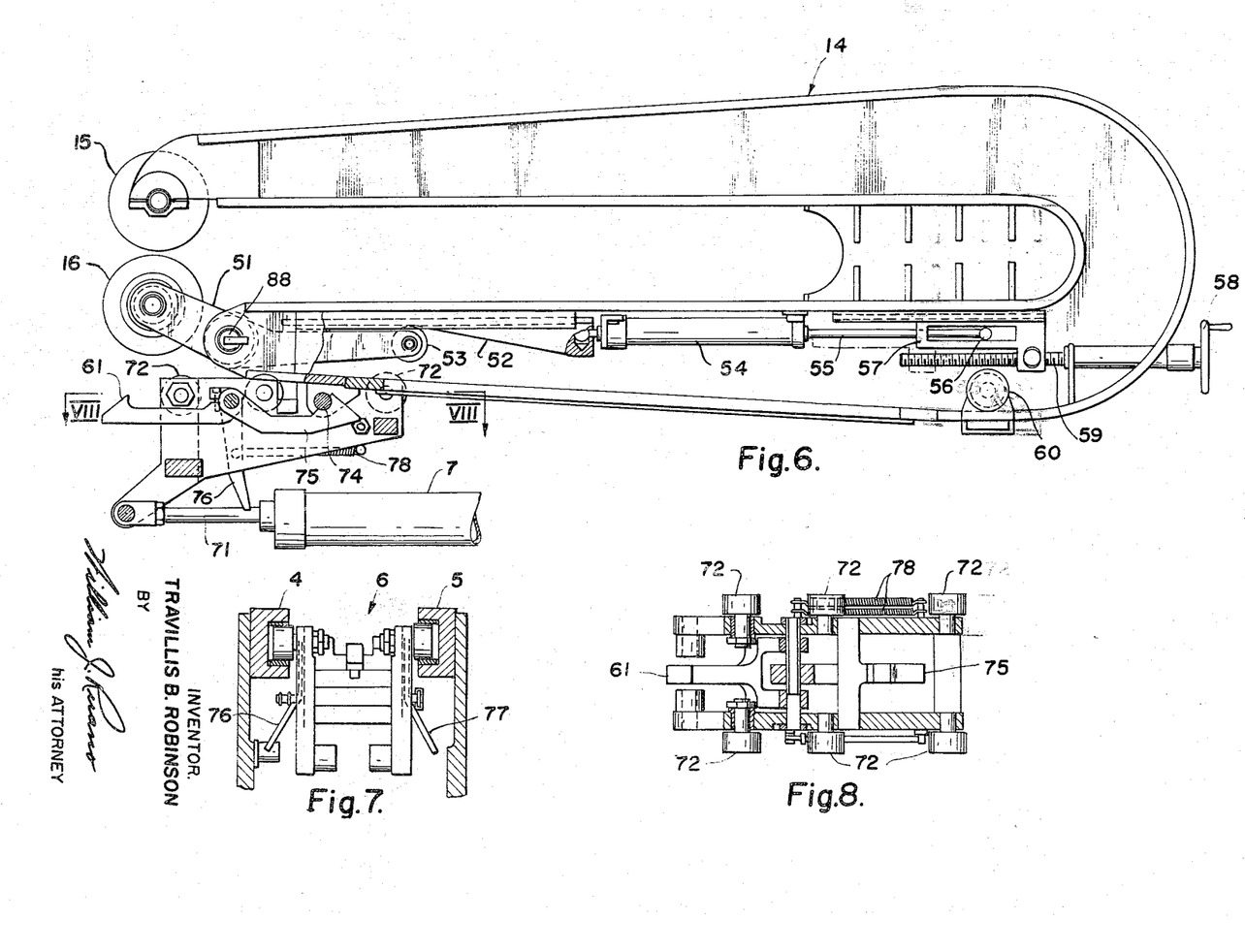
FIG. 6 is an enlarged view of the planishing unit shown in FIG. 1.
FIG. 7 is a transverse, cross-sectional view taken through the skate 6 and track therefor.
FIG. 8 is a cross-sectional view taken along line VIII—VIII of FIG. 6.

Such clockwise movement is adjustably limited by stop pin 56 secured to rod 55 as it approaches the end of a slot terminating at the inner end surface of a supporting carriage 57. By rotation of an adjusting crank or handle 58, screw 59 is turned, which is threaded to carriage 57, and the position of the inner end surface or stop may be varied so as to vary the closeness and pressure of the planishing rolls 15 and 16. As the fluid pressure in cylinder 54 pushes rod 55 to the right to the postion shown, planisher roll 16 will separate by a maximum amount from roll 15 to allow free passage of the strip therebetween. This spacing may be ¼" or more, or less depending on the thickness of the strips or sheets being planished.

The planisher assembly is towed or moved horizontally by rollers 72 and 60 under the power of fluid in cylinder 7, which effects selective horizontal sliding movement, in either direction, by skate 6. Therefore, when the skate hook or latch 75 latches onto rod 74 of the planisher assembly, it will move it into the planishing position and transversely of the butted strips along the weld within the adjustable limits indicated by the rolls 15a, 16a and 9a, 10a, shown in dash and dot outline in FIG. 1.

SKATE ASSEMBLY

The skate assembly is best shown in FIGS. 6, 7 and 8 and is slid horizontally by fluid cylinder 7 operating through a rod 71 to push or pull the skate or carriage 6 along tracks 4 and 5 (see FIG. 5) by means of rollers 60 and 72 which roll on said tracks 4 and 5. Hook 61 of the skate latches onto a part of the unit to be towed such as rod 73 on the shear head assembly 8 (see FIG. 1) or rod 74 of the planisher assembly 14 which is latched by hook 75. It will be apparent that after either the shear assembly 8 or planisher assembly 14 is hooked onto the skate 6, it is selectively moved in opposite directions by guided movement of the skate along tracks 4 and 5. Limit arms 76 and 77 will effect unlatching at the limit of movement against the action of return springs 78.

STRIP CLAMPING ASSEMBLY

The strip clamping assembly, which is best shown in FIG. 5, is for the purpose of controlling and accurately positioning the trailing edge of the leading strip and the leading edge of the trailing strip moving along the path shown by arrow 112. The trailing edge of the leading strip is first clamped and retarded by pinch rolls 31 and 32 to effect controlled movement into the shearing area of the trailing end portion of the leading strip, and thereafter as the strip comes to rest, it is clamped by clamps 39a and 69a. A similar sequential operation of pinch rolls 27 and 28, followed sequentially by clamps 39 and 69 control and clamp the leading end portion of the trailing strip in order to introduce it into the shearing area.

Adjustable stops are provided on the machine to control the limits of movement of the clamps toward each other to adjust the spacing between ends, between the limits of forcible contact and a measured gap.

If the strips are slightly overlapped, the shearing rolls 9 and 10 will simultaneously shear both the trailing edge of the leading strip and the leading edge of the trailing strip in a single operation and thus assure a square and exactly matching fit between the butted edges.

The respective movable pinch rolls are operated by vertically disposed fluid cylinders 30 and 34 which, through linkages or interconnection 29 and 33, respectively, which are vertically guided on the frame, will effect vertical movements of the movable pinch rolls 28 and 32, respectively. In FIG. 5, pinch roll 32 is shown in the upper or clamping position, whereas pinch roll 28 is shown in the open or separated position. Likewise clamps 69a and 39a are shown in the clamping position, clamp 39a having been actuated by hydraulic torque actuator or motor 64 operating through crank arm 65 to effect guided lifting movement by vertically sliding sleeves 66 along guide rods 67 stationarily held by yoke 68.

After the leading and trailing strips have been moved into contacting or slightly spaced relationship, preparatory to welding, additonal force may be applied by fingers 122 to remove wrinkles or bulges in the strip end portions and to push the ends into exact confronting relationship. The fingers 122 are pressed onto the strips by introducing air under pressure in flexible tubes 121 which, when inflated, push down on fingers 122 against the action of return springs 129 (see FIG. 15). Fingers 122 are preferably of heat conducting material, such as aluminum.

Figure 13:
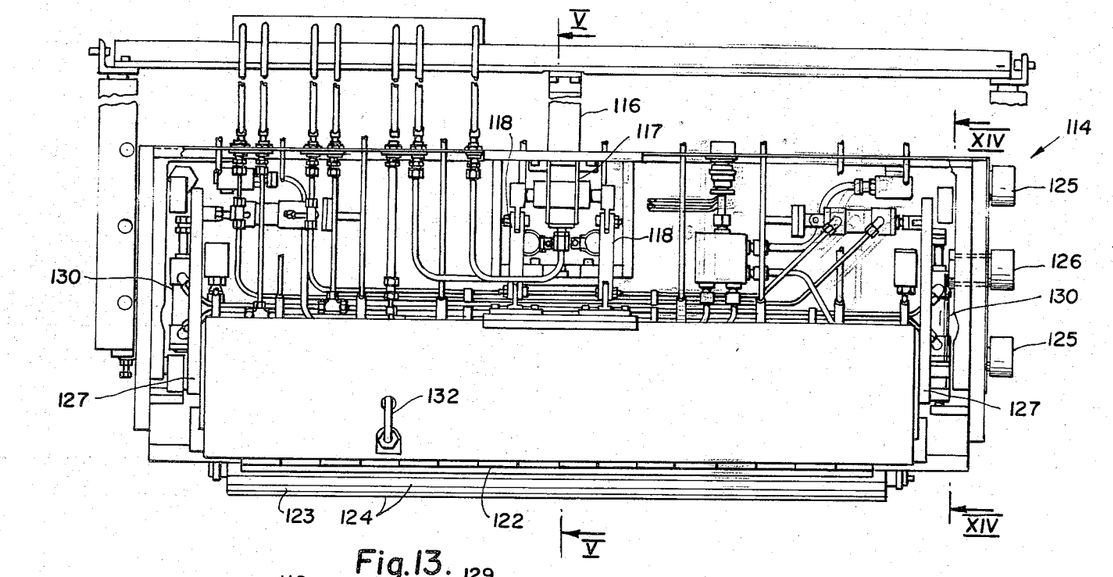
FIG. 13 is a plan view of one of the clamping finger assemblies 114 shown in FIG. 5, together with its piping and taken along line XIII—XIII of FIG. 5.
Figure 15:
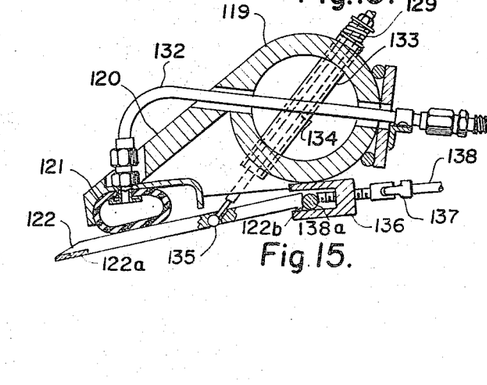
FIG. 15 is an enlarged, cross-sectional view of the clamping fingers and associated operating parts.

As shown in FIG. 15, finger 122 is connected by a ball joint 135 to a lifting rod 134 extending through tube 133. Return spring 129 keeps finger 122 lifted against tube 121 which is supplied by air under pressure through tube 132. The above described assembly is mounted on a frame 119. The end portions 122a of fingers 122, disposed in side-by-side relationship as best shown in FIG. 13, are preferably of good heat conducting material, such as copper or aluminum. Alternately, end portions 122a may be in the form of a continuous strip traversing all the fingers. Finger 122 is laterally adjustable by turning the threaded end portion of rod 138 by a knob at the end thereof through element 136 so as to adjustably push rod finger stop 138a of cylindrical shape against the angularly shaped rearmost end of the finger 122. Therefore, when tube 121 is inflated so as to push finger 122 downwardly, by camming action the angularly shaped end thereof will wedge against stop 138a and effect a slight movement to the left of finger 122 as viewed in FIG. 15. The end portion 122a slides on the strip and provdies, in effect, a moving pivot for clockwise rotational movement of finger 122 against the action of spring 129. Thus the opposing sets of fingers will not only push the ends of the strips downwardly but toward each other. A centrally disposed rounded projection 122b provides a self-aligning three point support, including the corners of the fingers, to insure complete contact between the fingers and strip as well as between the strip and back-up bar 124 (see FIG. 5).

Figure 14:
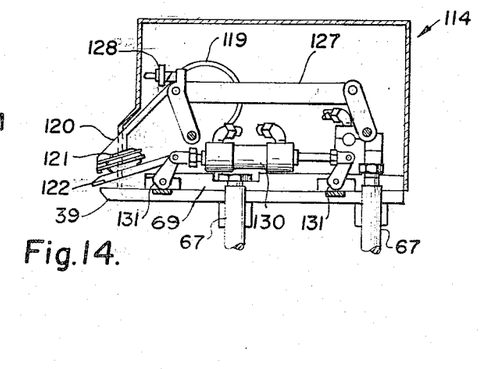
FIG. 14 is a cross-sectional view taken along line XIV—XIV of FIG. 13.

FIG. 14 shows a parallelogram linkage 127 connected to frame 119 so as to effect retraction of the assembly, as shown by the finger assembly at the left of FIG. 5, or projection of the assembly through an opening of the housing 141, as shown at the right of FIG. 5. Such retraction or projection of the finger assemblies is effected by hydraulic torque actuators or motors 117 through links 118 (see FIG. 5). Linkage 127 is limited in movement by adjustable stop 128 to provide the required gap between the opposing fingers 122 for welding. Air cylinder 130 operates cam link stops 131. The cam links hold clamps apart during strip feeding by pinch rolls. They are deactivated by photo-electric cell signal to permit full closing of clamps. As shown in FIG. 14, they should be holding clamps 39 and 69 apart about ¼". Rods 67 depend from the housing to guide clamp 39.

The entire assembly is guided horizontally by rollers 125, 126 (see FIG. 13) which ride on tracks 49 (see FIG. 2) disposed at right angles to tracks 4, 5.

TIMER 96

Figure 11:
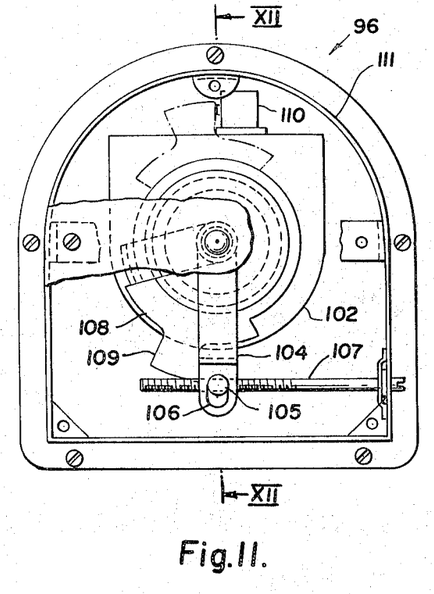
FIG. 11 is an elevational view of the timer assembly 96, shown in FIG. 2.
Figure 12:
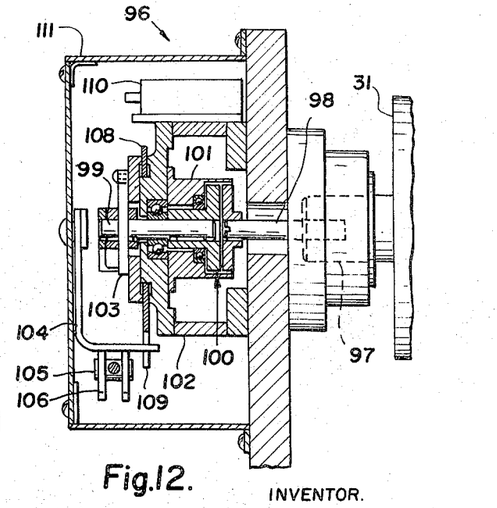
FIG. 12 is a cross-sectional view taken along line XII—XII of FIG. 11.

Timer 96, shown in detail in FIGS. 11 and 12, and enclosed in housing 111, is for the purpose of preselecting the number of revolutions or fractions thereof that driving roll 31 will rotate, whereby the strip is moved up to a predetermined position. The number of revolutions or more properly the degrees of rotation may be preselected by turning adjusting rod 107 so as to rotate stop arm 104 by pin 105 in slot 106. Stop arm 104 adjustably changes the initial position of extension 109 on plate 108, which rotates from the position shown in full lines to that shown in dash and dot outline. At the limit of rotational movement of plate 108, its extension 109 engages a limit switch 110 which opens so as to stop the driving motor which drives the drive roll 31.

Drive roll 31 has a shaft 97 coupled to shaft 98 of a clutch or coupling 100 which is magnetically operated and actuated by a significantly positioned sensing photocell.

Return spring 103 returns extension from the dash and dot position to the full line position when clutch 100 is uncoupled by means of a second function of switch 110, to prepare for the next cycle.

OPERATION

Figure 16:
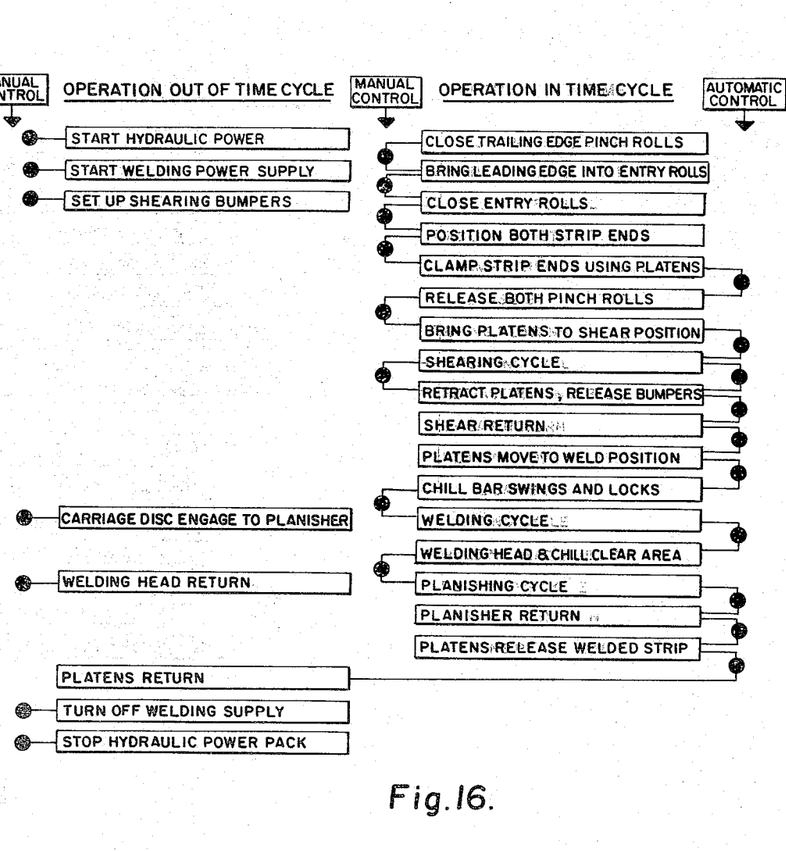
FIG. 16 is an operation sequence diagram and FIG. 17 is a relative time representation of the sequence of operations for automatic operation (as well as manual operation) of the apparatus shown.
Figure 17:
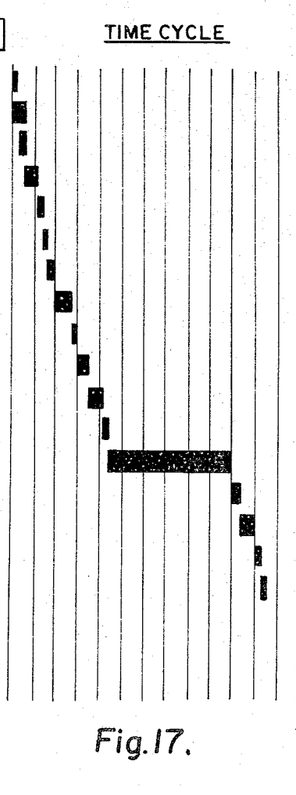

The operation of the machine, and, more specifically, the sequence of operations of the shearing, welding and planishing assemblies may be best understood by referring to FIGS. 16 and 17, which illustrate such sequence. Before the trailing edge of the leading strip enters the machine, a sensing device will actuate remote, heavy duty pinch rolls (not shown) to decelerate the trailing end of the strip to a stop, but which will allow the line to continue to run strip stored in an accumulator or equivalent facility (not shown). This automatically or normally roughly positions the trailing end. The exit pinch rolls 31, 32 close by lifting movement of the movable roll 32 against the strip (see FIG. 5), at which time there is partial lifting of movable clamp 39a to a predetermined elevation, determined by stops 131, to serve as a strip guide. The exit pinch rolls 31, 32 advance the trailing edge of the strip to a sensor which will actuate timer 96 (see FIGS. 2, 11 and 12) which energizes clutch 100 to cause the strip to be advanced a predetermined amount to the shear position. This will exactly position the trailing end of the leading strip in the shearing position. Similarly, there will be engagement of the trailing strip by closing of the entry pinch rolls 28, 27 and predetermined, partial lifting of clamp 39. The leading end of the strip is introduced into the closed running pinch rolls. The leading end engages a sensor which effects energization of clutch 100 coupled to drive roll 27 so as to rotate it a predetermined number of times, as determined by entry pinch roll timer 96, which will draw the leading end of the trailing strip to the proper position for shearing. The sensor may be a photo-electric cell, proximity switch, micro-switch or the like. The end portions of the strips are in shearing position so long as they are located in the space between shear blades 9, 10 (see FIG. 10), whether the end portions are overlapped or spaced apart.

The strip end portions are then firmly clamped between clamps 69a, 39a and 69, 39 by retracting cam link stops 131 (see FIG. 14) and both sets of pinch rolls 27, 28 and 32, 33 are released or spread apart.

The skate 6 will latch onto latch 73 of the shearing assembly 8 and effect horizontal movement thereof and in so doing effect shearing of the positioned strip end portions so that the ends of the strips, when moved together, will meet in exact abutting, overlapped or separated relationship preparatory to welding.

Upon completion of shearing, a signal is given to space the clamps in the order of an inch, more or less, so that the sheared edges will not be damaged by rubbing against the retracting shear unit as it is now moved to the initial, inoperative position.

The strip portions are then moved into end-to-end relationship to the weld position as follows. Hydraulic cylinders 116 are actuated to push against rods anchored at 115 so as to move both clamping assemblies (including clamps 69, 39, 69a, 39a, yokes 68 and hydraulic actuators 64) toward each other to draw the strips together to the welding position, that is, so that the leading edge portion of the trailing strip will either overlap or abut or become slightly spaced from the trailing edge portion of the leading strip. The mandrel 123, carrying a plurality of selectively usable chill bars 124, swings into the position shown in FIG. 5 after which it is latched in place by retractible latch 100. Torque actuators 117 cause link 118 to move to the position shown at right in FIG. 5. Air is introduced in tube 121 causing fingers 122 to press down tightly against the strip, as well as moving the confronting ends of the strips toward each other because of camming movement of the angular shaped ends of fingers 122 against stop 138*a* (see FIG. 15).

The welding head is then lowered and traversed along the confronting ends of the strips to complete the welding cycle. The welding head can be traversed from either end but normally is moved from left to right as viewed in FIG. 1 to effect welding. The mandrel 123 and the fingers 122 as well as the welding head are then retracted. Such retraction of the welding head is effected by hydraulic cylinder 46.

The skate, in response to a planishing signal, then picks-up and latches onto the planishing unit and traverses it along the weld to effect planishing in either direction or both directions to cold work the weld as well as to make it approach the parent metal thickness of the strip. When planishing is commenced, a control signal actuates hydraulic cylinder 54 to cause wedge 52 to move roll 53 and lever 51 clockwise (see FIG. 6) to move roll 16 toward roll 15 to pinch the strip. Upon completing the planish the skate then returns the planisher to the rest or inoperative position illustrated in FIG. 1.

Thereafter, the clamps 69, 69*a*, 39 39*a*, are opened and a control signal is given to the remotely positioned heavy duty pinch rolls (not shown) or to an equivalent device, such as a bridle (which has previously trapped the strip), to effect untrapping or release whereupon the supply portion will overspeed to be ready for the next cycle. Thus, the welded strip is pulled through the machine into the line until another trailing end enters the machine, at which time the above described operation is repeated.

In some situations, planishing may not be necessary at all, or perhaps not necessary in the same station, in which event the planishing assembly may be omitted in FIG. 1.

In such situation, the welder assembly, if desired, could be mounted in the same manner as the planisher assembly and moved into place and retracted by skate 6.

While FIG. 16 shows a typical sequence of operations and FIG. 17 shows a typical relative time cycle, these may be varied and the time cycle changed, depending upon the welding and strip material used and other factors.

It will also be apparent that the details of construction of the component parts, such as the shearing and planishing assemblies, skate, etc. may be varied while still accomplishing the objectives of the invention.

Thus it will be seen that I have provided an efficient apparatus and method for shearing, welding and planishing strips moving in a mill line or the like, whereby weakening or rupturing of the welded joint by pulling the welded strips is eliminated; furthermore, I have provided a novel combination and arrangement of elements, including reciprocable shearing and planishing units which may be separately towed or pushed by a novel skate or carriage to effect shearing and planishing, whereby only a relatively small, light weight unit need be reciprocated at a time, thus cutting down the size of the driving motor and reducing the power and space requirements for the machine; furthermore, I have provided a novel shearing unit including wedge-like adjusting means for adjustably off-setting the vertical center lines of the disc-like shear blades; also I have provided a uniquely adjustable planishing unit for providing selective pinching and cold working forces on the weld to reduce it to substantially the width of the parent metal and in so doing, cold working and increasing the strength of the weld so as to sustain enormous pulling forces without weakening the weld; furthermore, I have provided a novel pinch roll, and clamping assembly including a metering device for first moving the end portions of two strips together to the shearing position, then shearing the strips and finally moving the ends thereof to exact confronting relationship for welding, together with finger means for applying selective pressure to the confronting ends so they are separated, or in either light or tight contacting relationship when welding.

It is noted that while I have disclosed what I now consider to be the preferred embodiment of my invention, various changes, additions, omissions, and substitution may be made in the apparatus illustrated without departing from the spirit and scope of my invention as defined by the appended claims.

I claim:

1. Apparatus for welding metal strips togther in end-to-end relationship while the strips are moving along a line, comprising a frame, means mounted on said frame for clamping the strip end portions, a carriage mounted on said frame for reciprocating movement transversely of said strips, a shearing unit movably mounted on said frame and including a pair of shearing discs, latching means for detachably fastening said shearing unit to said carriage so as to be moved thereby along a path to simultaneously shear the ends of said strips and prepare them for welding, a welding head unit mounted on said frame for vertical lowering and lifting movement, means for traversing said welding head unit, when lowered, along said strip ends to weld them together, and a planisher unit horizontally movable on said frame and including latching means to enable detachable fastening thereof to said carriage for movement thereof by said carriage along a path to planish said weld, whereby said strips may be sequentially sheared, welded and planished at a single station.

2. Apparatus for joining the ends of metal strips traveling longitudinally in a line after bringing to rest the trailing end portion of a leading strip and the leading end portion of a trailing strip at a combined shearing and welding station, comprising power operated means for moving said end portions together to the shearing position, two pairs of clamping means, each pair comprised of an upper and lower power operated platen for clamping said end portions in the shearing position, two pairs of shearing means, each pair comprised of an upper and lower rotary shear blade, the planes of each of said blade being parallel to the planes of the other of said blades, the upper blade of each pair being positioned above the plane of the strips and the lower blade of each pair below the plane of the strips, all of said blades being supported by a carriage movable transversely of said line for simultaneously shearing both strip ends in one pass of said blades, means including control means for moving said sheared ends together to a preselected welding position while still clamped, said preselected welding position being substantially coincident with said shearing position, means for moving a chill bar directly underneath said ends, and a welder mounted for movement transversely of the strip path independently of the transverse movement of the shearing means to weld said sheared ends while still clamped from said previous shearing operation, whereby the shearing and welding operations are sequentially performed without unclamping the strip ends from said platens so as to obtain a more accurate joint.

3. Apparatus recited in claim 2 together with a plurality of chill fingers supported on said upper platens operated by fluid pressure means for applying downward pressure on said strip ends and small horizontal movement of said strip ends toward each other prior to welding to remove wrinkles and to bring the strip ends into proper relationship prior to welding.

4. Apparatus for joining metal strips while traveling in a line, comprising means for bringing the trailing end portion of a leading strip and the leading end portion of a trailing strip to rest at a shearing and welding station, means for rigidly clamping the end portions of said strips, said clamping means being comprised of upper members and lower members positioned on opposite sides of the plane of said strips, a carriage movable transversely of said line, shear means mounted on said carriage for shearing said clamped end portions simultaneously, means for moving said clamping means while still clamped to thereby position the sheared end portions together in confronting relationship at said shearing and welding station, means movable transversely of said line independently of the transverse movement of said carriage for welding the sheared confronting ends while still clamped from the prior shearing operation, whereby the shearing and welding operations are sequentially effected at the same station without unclamping the strip end portions, thereby providing greater accuracy and strength of the welded joint.

5. Apparatus as recited in claim 4 together with a plurality of fingers mounted on said upper members of said clamping means, fluid operated means for pushing down said fingers to thereby push down the top end portions of said strip end portions to remove wrinkles therefrom, and adjusting means for horizontally adjusting said fingers toward and away from the strip ends.

6. Apparatus for welding metal strips together in end-to-end relationship while traveling along a line, comprising means for retarding the trailing end portion of a leading metal strip and the leading end portion of a trailing metal strip, two pairs of power-operated pin rolls for clamping and retarding said strip end portions, means for driving said pairs of pinch rolls to move said respective end portions of said strips to the shearing position, power-operated clamping means for clamping said respective end portions, a carriage mounted on said frame for movement transversely of said strip, shear means mounted on said carriage for shearing said end portions simultaneously when clamped, a welding device mounted on said frame and reciprocable transversely of said line independently of the transverse movement of said carriage for welding said end portions together after they are sheared and while still clamped from the shearing operation whereby the shearing and welding operations are sequentially performed at a single station without unclamping.

7. In a machine for shearing and welding, at the same station, end portions of strips that are moving longitudinally along a line, in combination, a pair of rollers for engaging each of said end portions, hydraulic means for causing both pairs of said rollers to sequentially engage or disengage said strip end portions, motor means for driving each of said pairs of rollers, metering means for preselecting the number of revolutions of each of said pairs of rollers so that said end portions are driven by said respective motor means to the shear position, retractable means movable transversely of said line for shearing said end portions while in said shear position, means for positioning said strips at said station in proper position to be welded subsequent to said shearing operation, and retractable welding means movable transversely of said line independently of the transverse movement of said shearing means, for welding said end portions while still held in said shear position.

8. Apparatus as recited in claim 7 together with a pair of power-operated clamp means, each clamp means being comprised of an upper and lower member on opposite sides of the plane of the strip, and said pair of clamp means being within said station, each clamp means engaging one of said end portions of a strip, and power-operated means for moving both clamp means and strip end portions to the weld position.

9. A machine as recited in claim 8 together with finger means mounted on said upper members and operated by fluid pressure to engage the top surface of the end portion of each of said strips, together with back-up means for backing up the opposite bottom surface of each strip, whereby the ends of the strips will be brought into exact confronting relationship preparatory to welding.

10. A machine for shearing and welding, at the same station, metal strips traveling longitudinally along a straight line, said station having entry and exit portions, said machine comprising two pairs of pinch rolls, one pair being positioned at the entry position of said station and the other pair being positioned at the exit portion of said station, said two pairs of pinch rolls being operated by hydraulic means for selectively engaging and disengaging the trailing end portion of the leading strip and the leading end portion of a trailing strip, respectively, two pairs of clamping jaws, each pair including an upper member and a lower member positioned on opposite sides of the plane of said strips and being mounted within said station, said two pairs of clamping jaws being operated by power means for selectively clamping and unclamping the respective strip end portions, finger means mounted on the upper clamping members and being engageable with the top surface portion of each strip end portion, fluid operated flexible tube means engageable with the top surface of each of said finger means for pushing the finger means downwardly against said top surface of said strip end portions, means for moving said finger means laterally toward each other, whereby the strip ends may be brought into exact confronting relationship and at a predetermined distance apart, retractable means movable transversely of said line for shearing said end portions while in said shear position, means for positioning said strips at said station in proper position to be welded subsequent to said shearing operation, and retractable welding means, movable transversely of said line independently of the transverse movement of said shearing means, for welding said end portions while still held in said shear position.

11. A machine as recited in claim 10 wherein said finger means comprises a plurality of separate metallic fingers disposed in side-by-side relationship together with spring means for normally raising said fingers, and camming means for each of said finger means for effecting slight lateral movement of said respective fingers toward each other as a consequence of introduction of fluid pressure in said flexible tube means.

12. A machine as recited in claim 11 wherein said camming means comprises beveled end portions of said fingers and a rounded stop element engageable thereby, so that vertical movement of said beveled end portions effects lateral movement of said respective fingers toward each other to press out wrinkles in the confronting end portions of said metal strips.

13. A machine as recited in claim 12 in which each of said beveled end portions has a central bottom leg which, together with opposite corners on the strip engaging ends of the fingers forms a three point support for the fingers.

14. A machine as recited in claim 10 wherein said power means comprises a hydraulic torque actuator for moving one of said clamps of each pair vertically in opposite directions together with power operated means for laterally moving said respective pairs of clamping jaws and finger means simultaneously toward each other.

15. A machine as recited in claim 14 together with a retractable mandrel having a plurality of chill bars peripherally spaced thereon for selective use as a backing bar for supporting the bottom surface of the strip end portion opposite to said top surface which is engageable by said finger means.

16. In a machine for shearing and welding metal strips moving longitudinally along a line, comprising a frame, a shearing unit, track means, a carriage guided by said track means and having detachable fastening means for securing said shearing unit to the carriage so as to be towed thereby, a welding unit carried by said frame for welding the strips together subsequent to the shearing operation, a planishing unit adapted to be guided by said track means and which is selectively detachably fastened to said carriage so as to be towed thereby, said planishing unit comprising an elongated, substantially U-shaped frame with one leg of the U extending parallel to said track means, a pair of planishing rolls mounted on the extremities of said U-shaped frame, and fluid operated means for adjustably positioning one of said rolls with respect to the other to vary the pinching force on the metal strips while planishing.

17. A machine as recited in claim 16 wherein said fluid operated means includes a lever for pivoting one of said rolls on the extremity of said frame, a wedge for effecting selective pivotal movement of said lever, a hydraulic cylinder for horizontally reciprocating said wedge, and adjusting means for varying the extent of horizontal travel of said wedge, said wedge, cylinder and adjusting means being carried by the frame of said planishing unit.

References Cited by the Examiner

UNITED STATES PATENTS

| | | | |
|---|---|---|---|
| 2,181,502 | 11/1939 | Biggert | 228—5 |
| 2,203,151 | 6/1940 | Iverson | 228—4 |
| 2,642,663 | 6/1953 | Long | 83—208 |
| 2,782,488 | 2/1957 | Anderson | 219—82 |
| 2,896,505 | 7/1959 | Nations | 83—208 |
| 2,911,515 | 11/1959 | Cooper | 219—79 |
| 2,939,354 | 6/1960 | King | 83—210 |
| 2,941,491 | 6/1960 | Knost | 228—49 |
| 3,007,031 | 10/1961 | Cooper | 219—82 |
| 3,013,459 | 12/1961 | Coleman | 83—210 |
| 3,021,416 | 2/1962 | Mallett et al. | 219—82 |
| 3,131,663 | 5/1964 | Lawson | 228—5 |
| 3,198,931 | 8/1965 | Klempay | 228—5 |

JOHN F. CAMPBELL, *Primary Examiner.*

M. L. FAIGUS, *Assistant Examiner.*